(12) United States Patent
Knopp et al.

(10) Patent No.: US 11,025,336 B2
(45) Date of Patent: Jun. 1, 2021

(54) METHOD FOR OPERATING A COMMUNICATION SYSTEM

(71) Applicant: NEOSAT GmbH, Neubiberg (DE)

(72) Inventors: Andreas Knopp, Bad Elster (DE); Thomas Delamotte, Munich (DE); Christian Hofmann, Munich (DE); Robert Schwarz, Haar (DE); Kai-Uwe Storek, Dresden (DE)

(73) Assignee: NEOSAT GmbH, Neubiberg (DE)

( * ) Notice: Subject to any disclaimer, the term of this patent is extended or adjusted under 35 U.S.C. 154(b) by 22 days.

(21) Appl. No.: 16/202,981

(22) Filed: Nov. 28, 2018

(65) Prior Publication Data

US 2019/0222301 A1 Jul. 18, 2019

(30) Foreign Application Priority Data

Sep. 29, 2017 (EP) .................................... 17194149

(51) Int. Cl.
*H04B 7/185* (2006.01)
*H04B 1/7097* (2011.01)
(Continued)

(52) U.S. Cl.
CPC ....... *H04B 7/18532* (2013.01); *H04B 1/7097* (2013.01); *H04B 7/0452* (2013.01);
(Continued)

(58) Field of Classification Search
CPC .. H04B 17/336; H04B 1/7097; H04B 7/0452; H04B 7/185; H04B 7/18526; H04B 7/18532; H04B 7/2041
See application file for complete search history.

(56) References Cited

U.S. PATENT DOCUMENTS

| 2003/0125040 A1* | 7/2003 | Walton | H04B 7/0417 455/454 |
| 2008/0159425 A1* | 7/2008 | Khojastepour | H04B 7/0417 375/260 |

(Continued)

OTHER PUBLICATIONS

Xinping Yi et al.: "User Scheduling for Heterogenous Multiuser MIMO Systems: A Subspace viewpoint" ; IEEE Transactions on Vehicular Technology, vol. 60, No. 8, Oct. 2011; 10 pages.
Christopoulos Dimitrios et al.: "Multicast Multigroup Precoding and User Scheduling for Frame-Based Satellite Communications"; Nov. 26, 2012; 6 pages.
(Continued)

*Primary Examiner* — Kevin C. Harper
*Assistant Examiner* — Derrick V Rose
(74) *Attorney, Agent, or Firm* — Harness, Dickey & Pierce, P.L.C.

(57) ABSTRACT

Operating a communication system comprises providing N transmitting antennas (TA) for transmitting symbol streams (SST) and K ground receivers (GR) which may be provided with symbol streams (SST) transmitted by transmitting antennas (TA). Transmitting antennas (TA) are located with a distance from Earth (E). Ground receivers (GR) are spatially separated from each other, wherein the constraint K>N applies. The method includes:
  simultaneously transmitting N symbol streams (SST) by N transmitting antennas (TA),
  receiving a linear combination of N simultaneously transmitted symbol streams (SST) by each ground receiver (GR), respectively,
  determining the respective linear combination for N transmitting antennas (TA) and each of the K ground receivers (GR), respectively,
  deciding on the basis of the determined linear combinations which of the K ground receivers (GR) is assigned to a respective common receiver group in order to be simultaneously and with the same frequency provided with symbol streams (SST).

14 Claims, 3 Drawing Sheets

Figure 1:
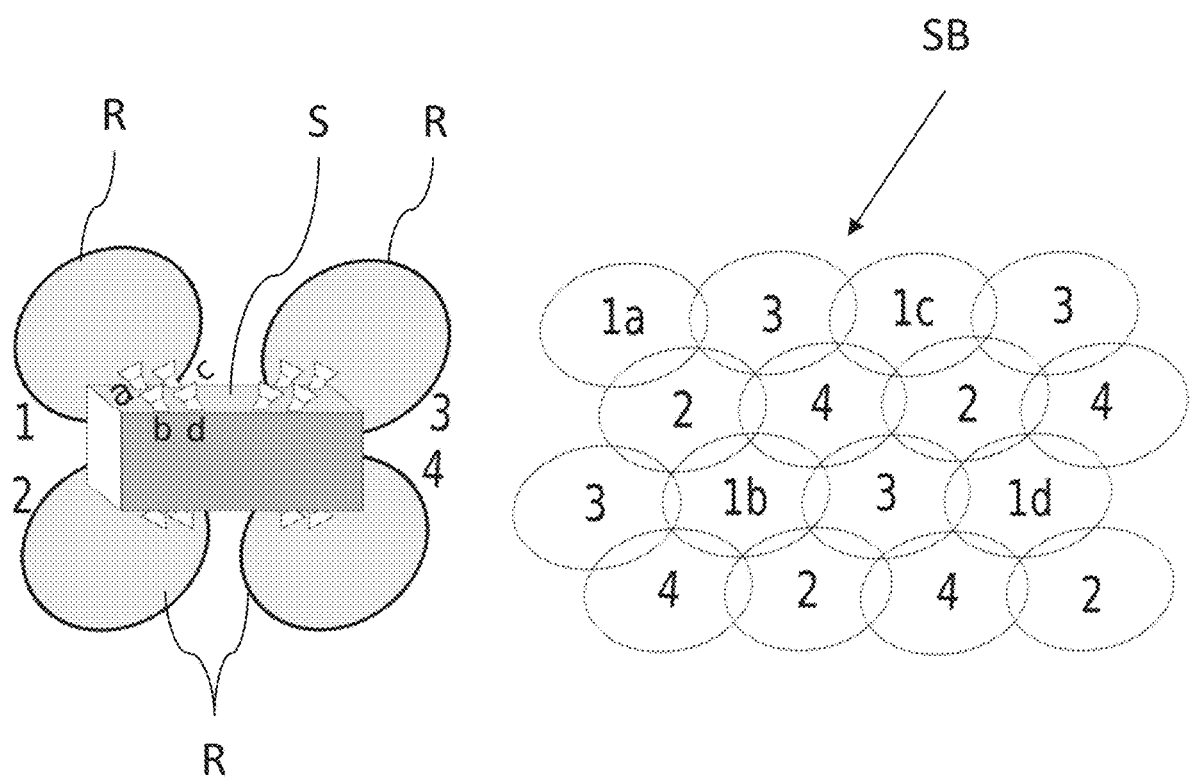

(51) Int. Cl.
*H04B 17/336* (2015.01)
*H04B 7/0452* (2017.01)
*H04B 7/204* (2006.01)

(52) U.S. Cl.
CPC ......... *H04B 7/185* (2013.01); *H04B 7/18526* (2013.01); *H04B 7/2041* (2013.01); *H04B 17/336* (2015.01)

(56) References Cited

U.S. PATENT DOCUMENTS

| | | | | |
|---|---|---|---|---|
| 2012/0300754 | A1* | 11/2012 | Rosenqvist | H04B 7/024 370/336 |
| 2017/0325221 | A1* | 11/2017 | Jalali | H04B 7/18502 |
| 2018/0368149 | A1* | 12/2018 | Raghavan | H04B 7/0632 |
| 2020/0091975 | A1* | 3/2020 | Park | H04B 7/0456 |

OTHER PUBLICATIONS

Cheng Wang et al.: "Adaptive Downlink Multi-User MIMO Wireless Systems for Correlated Channels with Imperfect CSI"; IEEE Transactions on Wireless Communications, vol. 5, No. 9, Sep. 2006; 12 pages.

Elmahdi Driouch et al.: "Efficient Scheduling Algorithms for Multiantenna CDMA Systems"; IEEE Transactions on Vehicula Technology, vol. 61, No. 2, Feb. 2012; 12 pages.

Eduardo Castañeda et al.: "An Overview on Resource Allocation Techniques for Multi-User MIMO Systems"; Nov. 14, 2016; 46 pages.

Christopoulos Dimitrios et al.: "User Scheduling for Coordinated Dual Satellite Systems with Linear Precoding"; Nov. 26, 2012; 6 pages.

Wiesel et al.: "Zero-Forcing Precoding and Generalized Inverses"; IEEE Transactions on Signal Processing; vol. 56, No. 9, Sep. 2008; 10 pages.

* cited by examiner

METHOD FOR OPERATING A COMMUNICATION SYSTEM

The invention relates to a method for operating a communication system, the communication system comprising transmitting antennas for transmitting symbol streams and ground receivers which may be provided with the symbol streams transmitted by the transmitting antennas, the transmitting antennas being located with a distance from Earth, and the ground receivers spatially separated from each other.

Contemporary high throughput satellites (HTSs) are the consequence of a constantly increasing demand for high data rates provided by satellites. As a result of the fact that the usable spectrum for satellite communication (SATCOM) is limited, frequency reuse techniques are an effective strategy to enhance the total capacity of a single satellite. To achieve this goal, many comparatively small beams (spot beams) are used to illuminate a specific service zone on Earth instead of using a single beam for the same area. Several of the in-orbit HTSs deploy a so-called four color scheme, ensuring different frequencies or polarizations for adjacent spot beams. Recent frequency reuse patterns, so-called aggressive frequency reuse schemes, even use the same frequency band and polarization in neighboring beams. To handle the impact of the unavoidable inter-beam interference (or co-channel interference (CCI)), different approaches like transmit precoding or interference mitigation techniques at the receiver side, often referred to as equalization, are subject of current research.

Under the assumption of a full frequency reuse (FFR) pattern, the downlink part (from the satellite to the receivers on Earth) of the forward link (FL) represents a multi-user multiple-input multiple-output (MU-MIMO) system. It is to be noted, that in the following the terms "user" and "receiver" are used in an equivalent manner. As a result of the CCI every ground terminal receives the signals from its dedicated satellite beam antenna as well as from satellite antennas illuminating adjacent service zones. A common transmitter technique to mitigate this interference is a joint preprocessing of the transmit signals of all antennas as described in D. Christopoulos, S. Chatzinotas, and B. Ottersten, "User scheduling for coordinated dual satellite systems with linear precoding," in IEEE International Conference on Communications, 2013, pp. 4498-4503.

Since there are much more receivers on Earth than transmit antennas available on the satelite, user scheduling is necessary. Scheduling algorithms can be divided into two classes, which are user selection and user grouping as described in X. Yi and E. K. S. Au, "User scheduling for heterogeneous multiuser MIMO systems: A subspace viewpoint," IEEE Transactions on Vehicular Technology, vol. 60, no. 8, pp. 4004-4013, 2011. User selection searches for only a single subset of all available users for scheduling. This is often necessary when the upper performance bound of a system is investigated where only the 'best' users, e.g. in terms of sum rate, should be selected. In terms of fixed satellite services (FSS), which are the workhorse of today's SATCOM industry, user selection algorithms have a limited relevance because the channel between satellite and receiver is nearly constant and only influenced by long-term fading effects, e.g. caused by rain. Hence, a user selection algorithm would select always the same users over a long period while the remaining users are starving. By contrast, user grouping algorithms schedule all users into groups which are served consecutively. The segmentation into groups can be done with respect to different fairness criteria. For SATCOM user grouping algorithms are of greater interest because a satellite provider generally aims at serving all of his customers, not only those with the best channel conditions.

It is the object of the invention to provide a low complexity receiver-grouping method that considers the fairness between the receivers, i.e. the respective users, while maximizing the system throughput.

This object is addressed by the subject matter of claim 1. Preferred embodiments of the invention are described in the sub claims.

Therefore according to the invention, a method for operating a communication system is provided, the communication system comprising a number of N transmitting antennas for transmitting symbol streams and a number of K ground receivers which may be provided with the symbol streams transmitted by the transmitting antennas, the transmitting antennas being located with a distance from Earth, and the ground receivers being spatially separated from each other, wherein K>N, the method comprising the following method steps:

simultaneously transmitting N symbol streams by the N transmitting antennas with the same frequency, receiving of a linear combination of the N simultaneously transmitted symbol streams by each ground receiver, respectively, determining of the respective linear combination for the N transmitting antennas and each of the K ground receivers, respectively, deciding on the basis of the determined linear combinations which of the K ground receivers is assigned to a respective common receiver group in order to be simultaneously and with the same frequency provided with symbol streams, by generating a number of E empty receiver groups, assigning a respective ground receiver to a respective receiver group until the receiver groups each comprise a predetermined respective number $V_i$, of ground receivers, after each receiver group comprises $V_i$, ground receivers, on the basis of a metric function which delivers a metric value, examining for all ground receivers which have not yet been assigned to a receiver group except for a number of maximal M ground receivers how a respective further ground receiver can be combined with the ground receivers which have already been assigned to a respective receiver group in order to achieve better data throughput for the symbol streams compared with an assignment of the ground receivers to the respective receiver groups which is purely random, by assigning the respective further ground receiver to such a receiver group in which the lowest metric value between the further ground receiver and the ground receivers already assigned to this group is highest compared with the other receiver groups, or assigning the respective further ground receiver to such a receiver group which, after the addition of the further ground receiver, achieves a metric value as a group which exceeds a predefined threshold value, or generating a new empty receiver group and assigning the respective further ground receiver to this new receiver group, assigning the other maximum M ground receivers to a respective receiver group without examination on the basis of the metric function until all ground receivers are assigned to a respective receiver group.

The step of assigning the other maximum M ground receivers to a respective receiver group without examination on the basis of the metric function until all ground receivers are assigned to a respective receiver group may be split up and may be fully or partly performed at any time during the method according to the invention, i.e. not only at the end. Preferably, this step is performed purely randomly, i.e. the maximum M ground receivers are assigned to a respective receiver group in a purely random fashion. The best result may be achieved if for number M of ground receivers which are assigned to a respective group without examination on the basis of the metric function the constraint M=0 applies.

The transmitting antennas may be of different types. Inter alia, the transmitting antenna may be of a reflector type which is fed by single feed or by an array of feeds.

The assigning of the further ground receiver to a respective receiver group may be performed based on different aspects. However, according to the invention, the respective further ground receiver is assigned to that receiver group in which the lowest metric value between the further ground receiver and the ground receivers already assigned to this group is highest compared with the other receiver groups. Alternatively, according to a preferred embodiment of the invention, the respective further ground receiver is assigned to that receiver group which, after the addition of the further ground receiver, achieves the best metric value as a group.

Preferably, all transmitting antennas and all ground receivers use the same frequency. In this respect, according to a preferred embodiment of the invention, the method further comprises the following method step:

transmitting symbol streams to all ground receivers of a respective receiver group, by
precoding the symbol streams for the ground receivers of a respective receiver group in order to reduce interferences at the respective ground receivers,
sending the precoded symbol streams to the N transmitting antennas, and
transmitting the precoded symbol streams from the N transmitting antennas to the ground receivers.

Interferences are due to the fact that all transmitting antennas and all ground receivers use the same frequency and that each ground receiver receives a linear combination of the symbol streams. Such interferences may be addressed by precoding. For precoding, conventional MIMO protocols may be used. According to a preferred embodiment, precoding may be performed on the basis of inversion of the channel matrix of a receiver group or on the basis of a method according to A. Wiesel, S. Member, Y. C. Eldar, S. Member, and S. S. Shitz, "Zero-Forcing Precoding and Generalized Inverses," vol. 56, no. 9, pp. 4409-4418, 2008. Preferably, precoding of the symbol streams for the ground receivers is performed on the Earth, i.e. before the symbol streams are sent from the Earth to the transmitting antennas or at a distance from Earth, e.g. on a satellite where the transmitting antennas are located.

According to a preferred embodiment of the invention, a new empty receiver group is generated and the respective further ground receiver is assigned to this new receiver group when the addition of the respective further ground receiver to an existing receiver group the metric value does not exceed a predefined threshold value. In this regard, as a metric value the dot product of the linear combinations, a modification of the dot product of the linear combinations, an orthogonal projection of the linear combinations, the signal-to-interference-and-noise-ratio, the signal-over-leakage capacity, the sum rate and/or the channel capacity is used which is yielded when all channel information of one receiver group together with the other receiver groups are combined to one channel matrix.

Preferably, the number of $V_i$ ground receivers which are assigned to the receiver groups first, are assigned to the receiver groups in a purely random fashion. Optimal results may be achieved if the constraint $V_i=1$ applies. Further, according to a preferred embodiment of the invention, the number of $V_i$ ground receivers which are assigned to the receiver groups first, are those ground receivers which comprise a linear combination the norm of which is highest or lowest, respectively. Furthermore, according to a preferred embodiment of the invention, the number of E of empty receiver groups is chosen as an integer wherein the constraint $E \geq K/N$ applies.

Determining the linear combinations between the transmit antennas and the ground receivers may be performed in different ways. However, according to a preferred embodiment of the invention, for determining the linear combinations between the N transmit antennas and each of the K ground receivers the position of the N transmitting antennas and the position of the K ground receivers is determined and/or a channel estimation method is applied.

Preferably, the ground receivers do not exchange data with each other.

According to a preferred embodiment of the invention, the transmitting antennas are satellite based. Even more preferably, the transmitting antennas are based on a single satellite in space.

Alternatively, according to a preferred embodiment of the invention, the transmitting antennas are located on a high-altitude platform station. However, also a preferred embodiment of the invention may apply according to which at least one satellite and at least one high-altitude platform station are used in combination for locating the transmit antennas.

Two preferred applications for the present transmission and scheduling scheme are satellite based internet access provisioning as well as video-on-demand (VOD) provisioning. Currently, multimedia products offered by satellite providers are usually broadcast services. By contrast, the user demand continuously shifts to individually requested media content. VOD services require a unicast connection with sufficiently dimensioned bandwidth to each customer. Furthermore, flexibility in terms of resource allocation is needed, since VOD services are often used over a limited period only. Both parts, user links with high data rates as well as fast resource reallocation, may be covered by the transmission scheme according to the present invention.

According to preferred embodiments of the invention, the ground receivers are located on earth on a respective fixed position or located on earth stations on mobile platforms. The term "earth stations on mobile platform" (ESOMP) especially refers to the possibility for providing broadband connectivity to passengers on board moving vehicles, including aircrafts, ships and trains.

These and other aspects of the invention will be apparent from and elucidated with reference to the embodiments described hereinafter. Such an embodiment does not necessarily represent the full scope of the invention, however, and reference is made therefore to the claims and herein for interpreting the scope of the invention.

Figure 2:
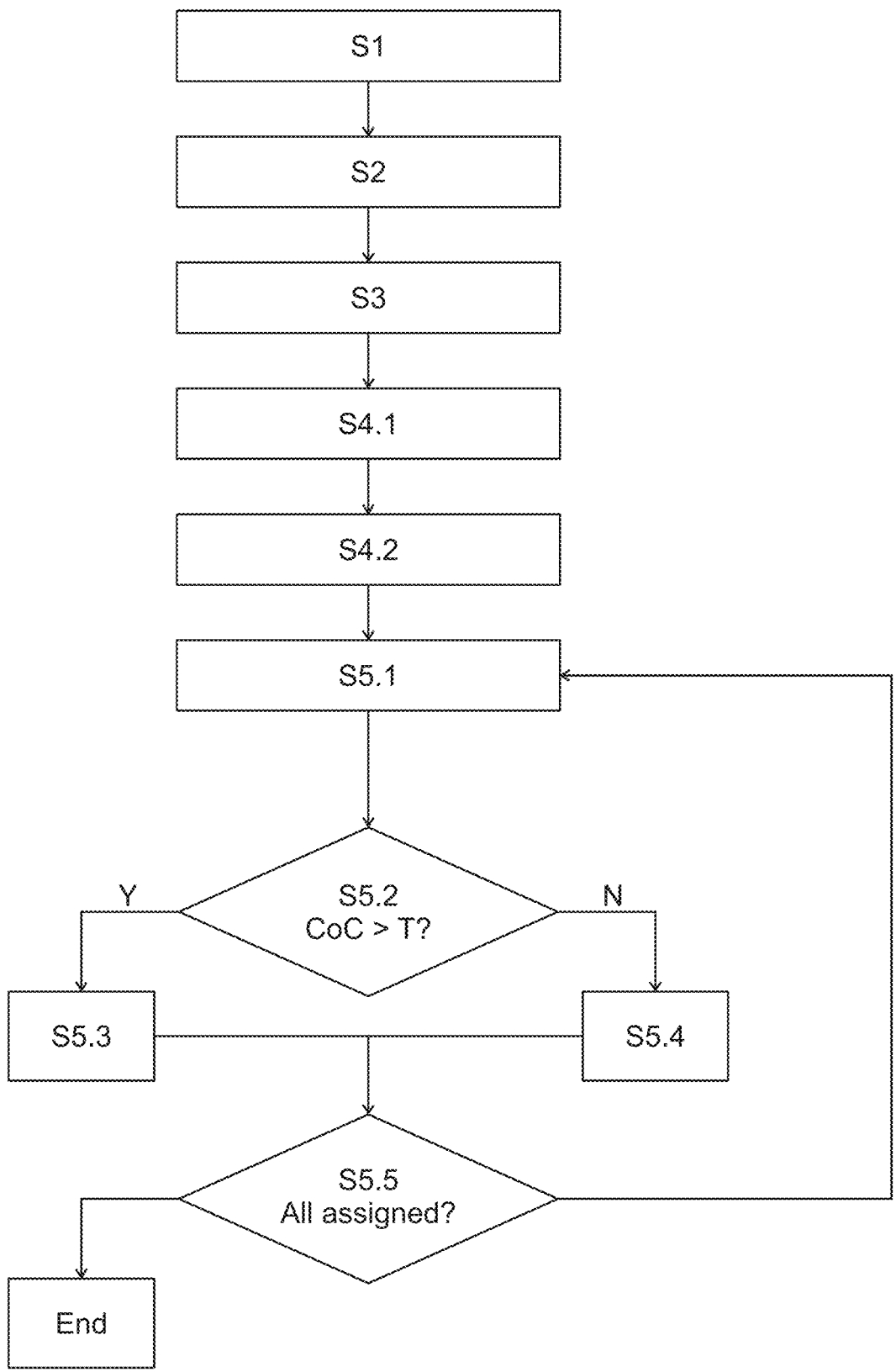
Figure 3:
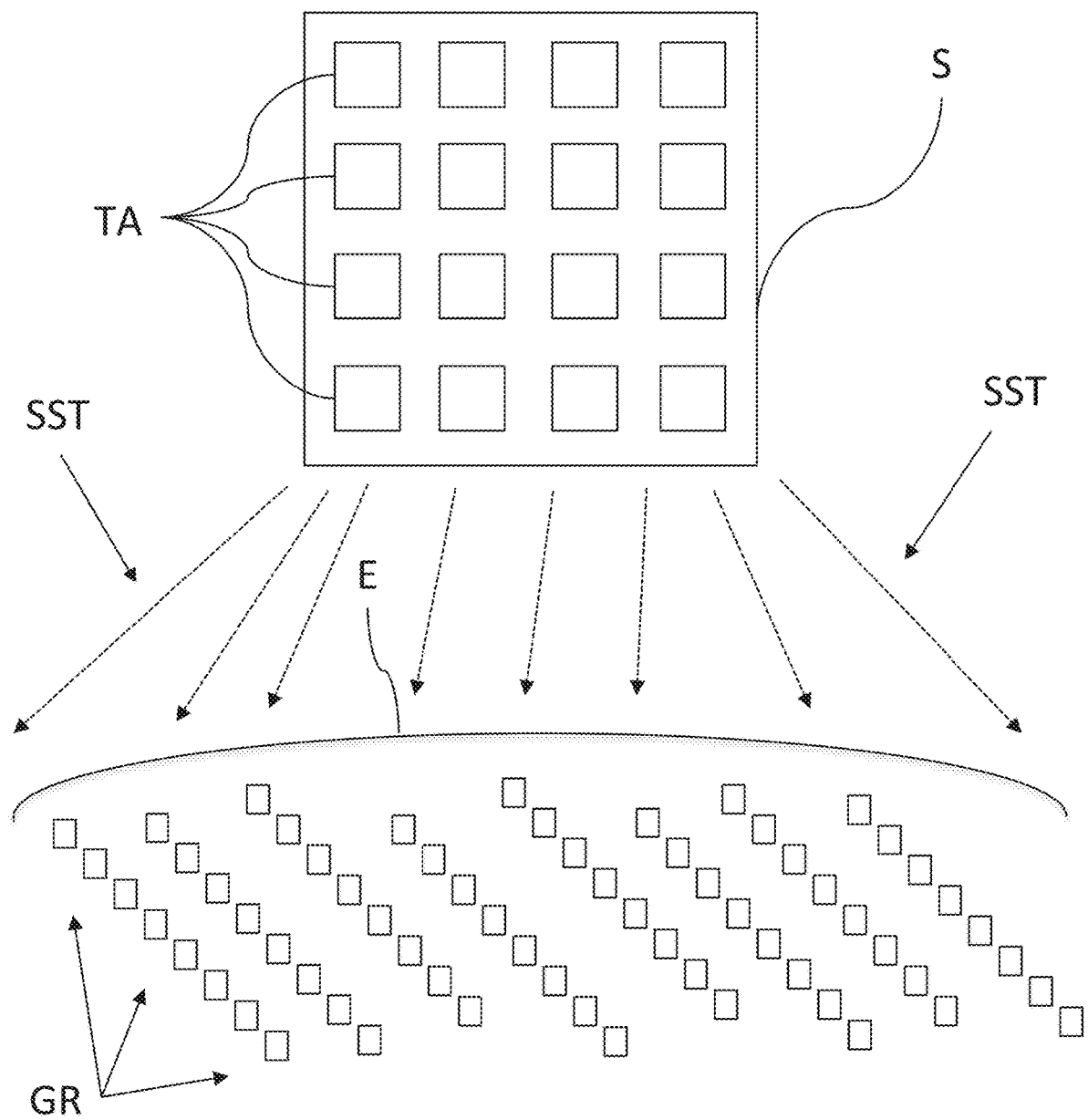

In the drawings:

FIG. 1 schematically depicts the beam and reflector setup according to a preferred embodiment of the invention, FIG. 2 depicts a flow chart of an exemplary embodiment of a method according to the invention, and FIG. 3 schematically depicts the setup which is used for the method according to the flow chart of FIG. 2.

In the following the downlink part with respect to the forward link of a geostationary multi-beam satellite scenario with multiple discrete array fed reflectors is described as a preferred embodiment of the invention. For the sake of reduced complexity, a single-feed-per-beam (SFPB) architecture is considered. $N_R$ reflectors are fed by $N_F$ feeds in total ($N_F/N_R$ feeds per reflector), which leads to $N_F$ spot beams on the ground. Adjacent coverage areas are illuminated by different reflectors. A satellite architecture that utilizes multiple multi-beam antennas to illuminate the coverage zone is already used by satellites in orbit according to the Eutelsat HTS system.

FIG. 1 schematically illustrates the beam and reflector setup according to the preferred embodiment of the invention. Here, for a satellite S, the number of reflectors R is $N_R=4$ and the number of feeds $N_F=16$. The Arabic numerals inside the spot beams SB indicate the source reflector. For reflector 1 the source feeds are marked by the letters a to d. The individual link between the $N_F$ feeds and a single user on the ground represents a Multiple-Input Single-Output (MISO) channel.

FFR over all spot beams SB is intended according to this preferred embodiment of the invention for an enhanced spectral efficiency. The K total users on Earth ($K \gg N_F$) are uniformly distributed over all beams. For a given time instance, $K_{sel}$ users ($K^{sel} \leq N_F$) are served via space division multiple access (SDMA). That means a group consisting of $K_{sel}$ users is provided with data over the same time slot, frequency band, and polarization. Several user groups are necessary in order to handle all the K users in the coverage area. These groups are active in a consecutive order—one time slot for every group, known as time division multiple access (TDMA).

In SATCOM there are much more users on Earth than transmit antennas or feeds at the satellite. In conventional systems with linear signal processing, the multiplexing gain arising from multiple transmit and receive antennas can be scaled up to $|K_{sel}| \leq N_F$ as described in E. Castaneda, A. Silva, A. Gameiro, and M. Kountouris, "An Overview on Resource Allocation Techniques for Multi-User MIMO Systems," IEEE Communications Surveys & Tutorials, vol. 20, no. c, pp. 1-1, 2016. A wide spread approach to evaluate and compare different MU-MIMO systems or scheduling algorithms is to find a single subset of users that maximizes a given performance criterion. This strategy is known as user selection. The results can be meaningful with respect to upper bounds but in SATCOM their relevance is limited. Taking only the best user set into account implies that no resources will be allocated to the remaining users. If the channel conditions of the users, which represent the basis of the scheduling decision, do not change or vary over time, the selected and served user subset $K_{sel}$ might be nearly constant for each scheduling instance. Thus, the overwhelming majority of the K users will never be scheduled for signal transmission with this approach.

From a satellite provider's point of view, it is of greater interest how a MU-MIMO system performs if all users have to be scheduled. So instead of finding a single subset the preferred embodiment of the invention focuses on finding disjoint subsets or rather groups. This procedure is known as user grouping and ensures that every user is scheduled exactly once within a scheduling period. In every user group T there can be served up to $N_F$ users at the same time.

In the development of the scheduling method according to the preferred embodiment of the invention, three major aspects are considered:

1) Group number minimization: Since the user groups are separated via TDMA, every additional group consumes an extra time slot. This implies that all groups are served less frequently and, therefore, the data rate available for the individual groups is reduced. Thus, to provide the basis for high data rates for every group, the number of groups has to be minimized. As a consequence thereof the amount of users per group should be maximized.

2) Fairness: Every group and every user within a group should achieve similar data rates as it is the case for conventional four color schemes.

3) Computational complexity: Even for satellites using the spot beam architecture, there can be up to several hundred users per beam. Therefore, the computational complexity of the scheduler needs to be sufficiently low in order to finish the scheduling process in the gateway station in a short time. This is necessary to handle the activation and deactivation of user terminals within a reasonable period.

Because of the fact that the search space—even for small numbers of $N_F$ and K—is prohibitively large, the grouping of the users is performed in a greedy manner. To decide which users can be co-scheduled and served together within a common time slot via SDMA, their spatial compatibility is evaluated. According to the preferred embodiment of the invention, an appropriate metric is selected in accordance with the channel model in order to provide a reliable forecast of the channel capacity or throughput. The metric according to the preferred embodiment of the invention in the envisaged scenario takes into account two major aspects: The orthogonality of the channel matrix H and the individual channel gains, i.e. the entries of H. To obtain an orthogonal channel matrix, the spacing between the receivers on Earth must be adequate. This optimal spacing is strongly coupled with the arrangement of the satellite transmit antennas. One metric that takes both aspects, orthogonality and gains, into account is the coefficient of correlation (CoC) which is defined as $$\cos(\angle(h_i, h_j)) = \frac{|h_i^H h_j|}{\|h_i\| \|h_j\|}$$

where CoC=0 implies that the channels of user i and j are orthogonal or spatially uncorrelated. The CoC is a reliable indicator for the scheduler how efficient user i can be provided with data without influencing the user j, and vice versa. There exist numerous alternative metrics in the literature. The CoC as described before can be calculated very quickly and is, therefore, suitable even for grouping problems of large scale.

The key idea according to this preferred embodiment of the invention, is to use CoC as a group policy and to assemble so-called ε-orthogonal user groups. This means that CoC, calculated for all combinations of members inside a group, does not exceed a certain threshold ε. Therefore, a lower limit of orthogonality between all the user channels of a common group is ensured. Users are grouped together and served via SDMA only if the orthogonality of the user channels among themselves exceeds a certain threshold. The optimal value for ε depends on the channel characteristics and is identified through computer simulations.

In general, the method according to the present invention can be summarized as follows: Within the initialization phase the minimum number of required groups $N_G$ is identified and the groups are created. In the next step, the users with the largest vector norm are selected to be the first user of each group. Because of the imperfect orthogonality within a user group, the achievable signal-to-interference-plus-noise-ratio decreases with every additional user of a group when zero forcing precoding is used. To avoid that the users with the strongest channel gains mutually influence each other, these users are separated in different groups at startup. During the main part of the method, for every selected user that group is selected where this user has the lowest impact to the orthogonality of the group, otherwise a new group for that user is created. These steps are repeated until all users are scheduled.

In detail, an exemplary embodiment of a method according to the invention is depicted in the flow chart of FIG. 2. According to this exemplary embodiment, a method for operating a communication system is provided, the communication system comprising a number of N transmitting antennas TA for transmitting symbol streams SST (indicated by arrows with dashed lines in FIG. 3) and a number of K ground receivers GR which may be provided with the symbol streams SST transmitted by the transmitting antennas TA. The transmitting antennas TA are located with a distance from Earth E together on one single satellite S, and the ground receivers GR are located on Earth E and spatially separated from each other. For the numbers K and N the constraint K>N applies. A respective setup is schematically depicted in FIG. 3.

As a first step S1, N symbol streams SST are transmitted by the N transmitting antennas TA. In step S2, a linear combination of the N simultaneously transmitted symbol streams SST is received by each ground receiver GR, respectively. Then, in step S3, the respective linear combination for the N transmitting antennas TA and each of the K ground receivers GR are determined, respectively. Then, it is decided on the basis of the determined linear combinations which of the K ground receivers GR is assigned to a respective common receiver group in order to be simultaneously and with the same frequency provided with symbol streams SST. This is performed by the following sub steps:

First, in step 4.1, a number of E empty receiver groups is generated. In step 4.2, one single ground receiver GR is assigned to each receiver group, respectively, in a totally randomly fashion. Then, on the basis of the metric function mentioned above which delivers metric value CoC, it is examined for all ground receivers GR which have not yet been assigned to a receiver group how a respective further ground receiver GR can be combined with the ground receivers GR which have already been assigned to a respective receiver group in order to achieve better data throughput for the symbol streams SST compared with an assignment of the ground receivers GR to the respective receiver groups which is purely random. This is performed by the following sub steps:

In step S5.1, for a further ground receiver GR which is to be assigned to a receiver group next, the lowest metric values between the further ground receiver and the ground receivers already assigned to this group are determined for all receiver groups. Then, it is checked for which group these lowest metric value of a respective ground receiver (GR) is highest.

Thereafter, it is checked in step 5.2 whether this metric value (highest member of the lowest metric values throughout the groups) exceeds a predefined threshold value T. If this is the case, the further ground receiver GR which is to be assigned to a receiver group next, is assigned to the receiver group which comprises that ground receiver GR which comprises above mentioned highest member of the lowest metric values throughout the groups in step 5.3.

However, in case this metric value does not exceed the predefined threshold value T, a new empty receiver group is generated in step 5.4 and the respective further ground receiver GR is assigned to this new receiver group. Then, in step 5.5 it is checked whether all ground receivers GR have already been assigned to a receiver group. If this is the case, the assignment method ends. If this is not the case, the method goes back to step 5.1 and is repeated until the last unassigned ground receiver GR has been assigned to a receiver group.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope. Further, for the sake of clearness, not all elements in the drawings may have been supplied with reference signs.

The invention claimed is:

1. Method for operating a communication system, the communication system comprising a number of N transmitting antennas (TA) for transmitting symbol streams (SST) and a number of K ground receivers (GR) which may be provided with the symbol streams (SST) transmitted by the transmitting antennas (TA), the transmitting antennas (TA) being located with a distance from Earth (E), and the ground receivers (GR) being spatially separated from each other, wherein K>N, the method comprising the following method steps:

simultaneously transmitting N symbol streams (SST) by the N transmitting antennas (TA), receiving of a linear combination of the N simultaneously transmitted symbol streams (SST) by each ground receiver (GR), respectively, determining of the respective linear combination for the N transmitting antennas (TA) and each of the K ground receivers (GR), respectively, deciding on the basis of the determined linear combinations which of the K ground receivers (GR) is assigned to a respective common receiver group in order to be simultaneously and with the same frequency provided with symbol streams (SST), by generating a number of E empty receiver groups, assigning a respective ground receiver (GR) to a respective receiver group until the receiver groups each comprise a predetermined respective number $V_i$ of ground receivers (GR), after each receiver group comprises $V_i$ ground receivers (GR), on the basis of a metric function which delivers a metric value, examining for all ground receivers (GR) which have not yet been assigned to a receiver group except for a number of maximal M ground receivers (GR) how a respective further ground receiver (GR) can be combined with the ground receivers (GR) which have already been assigned to a respective receiver group in order to achieve better data throughput for the symbol streams (SST) compared with an assignment of the ground receivers (GR) to the respective receiver groups which is purely random, by either generating a new empty receiver group and assigning the respective further ground receiver (GR) to this new receiver group when for the addition of the respective further ground receiver (GR) to an existing receiver group the metric value does not exceed a predefined threshold value (T), or when for the addition of the respective further ground receiver (GR) to an existing receiver group the metric value exceeds or is equal to the predefined threshold value (T), assigning the respective further ground receiver (GR) to such a receiver group in which the lowest metric value between the further ground receiver (GR) and the ground receivers (GR) already assigned to this group is highest compared with the other receiver groups; and assigning the other maximum M ground receivers (GR) to a respective receiver group without examination on the basis of the metric function until all ground receivers (GR) are assigned to a respective receiver group.

2. Method according to claim 1, wherein all transmitting antennas (TA) and all ground receivers (GR) use the same frequency.

3. Method according to claim 2, comprising the following method step:

transmitting symbol streams (SST) to all ground receivers (GR) of a respective receiver group, by precoding the symbol streams (SST) for the ground receivers (GR) of a respective receiver group in order to reduce interferences at the respective ground receivers (GR), sending the precoded symbol streams to the N transmitting antennas (TA), and transmitting the precoded symbol streams (SST) from the N transmitting antennas (TA) to the ground receivers.

4. Method according to claim 3, comprising the following method step:

precoding the symbol streams (SST) for the ground receivers (GR) on the Earth (E) or at a distance from Earth (E).

5. Method according to claim 1, wherein as a metric value the dot product of the linear combinations, a modification of the dot product of the linear combinations, an orthogonal projection of the linear combinations, the signal-to-interference-and-noise-ratio, the signal-over-leakage capacity, the sum rate and/or the channel capacity is used which is yielded when all channel information of one receiver group together with the other receiver groups are combined to one channel matrix.

6. Method according to claim 1, wherein the constraint $V_i=1$ applies.

7. Method according to claim 1, wherein the number of $V_i$ ground receivers (GR) which are assigned to the receiver groups first, are assigned to the receiver groups in a purely random fashion.

8. Method according to claim 1, wherein the number of $V_i$ ground receivers (GR) which are assigned to the receiver groups first, are those ground receivers (GR) which comprise a linear combination the norm of which is highest or lowest, respectively.

9. Method according to claim 1, wherein the number of E of empty receiver groups is chosen as an integer wherein the constraint $E \geq K/N$ applies.

10. Method according to claim 1, wherein for determining the linear combinations between the N transmit antennas (TA) and each of the K ground receivers (GR) the position of the N transmitting antennas (TA) and the position of the K ground receivers (GR) is determined and/or a channel estimation method is applied.

11. Method according to claim 1, wherein the ground receivers (GR) do not exchange data with each other.

12. Method according to claim 1, wherein the transmitting antennas (TA) are satellite based, and preferably based on a single satellite (S) in space.

13. Method according to claim 1, wherein the transmitting antennas (TA) are located on a high-altitude platform station.

14. Method according to claim 1, wherein the ground receivers (GR) are located on earth on a respective fixed position or located on earth stations on mobile platforms.

* * * * *